United States Patent
Kamiya

(10) Patent No.: US 10,208,826 B2
(45) Date of Patent: Feb. 19, 2019

(54) IMPACT-ABSORBING MATERIAL AND METHOD FOR PRODUCING IMPACT-ABSORBING MATERIAL

(71) Applicant: KABUSHIKI KAISHA TOYOTA JIDOSHOKKI, Kariya-shi, Aichi-ken (JP)

(72) Inventor: Ryuta Kamiya, Kariya (JP)

(73) Assignee: KABUSHIKI KAISHA TOYOTA JIDOSHOKKI, Kariya-shi, Achi-ken (JP)

( * ) Notice: Subject to any disclaimer, the term of this patent is extended or adjusted under 35 U.S.C. 154(b) by 0 days.

(21) Appl. No.: 15/529,189

(22) PCT Filed: Nov. 20, 2015

(86) PCT No.: PCT/JP2015/082751
§ 371 (c)(1),
(2) Date: May 24, 2017

(87) PCT Pub. No.: WO2016/084748
PCT Pub. Date: Jun. 2, 2016

(65) Prior Publication Data
US 2017/0328435 A1    Nov. 16, 2017

(30) Foreign Application Priority Data
Nov. 28, 2014 (JP) .................. 2014-240998

(51) Int. Cl.
*B32B 3/04* (2006.01)
*F16F 7/12* (2006.01)
(Continued)

(52) U.S. Cl.
CPC .......... *F16F 7/124* (2013.01); *B29C 66/7212* (2013.01); *B32B 1/08* (2013.01);
(Continued)

(58) Field of Classification Search
USPC ........ 188/371, 376, 377; 428/105, 118, 137; 296/187.03, 205
See application file for complete search history.

(56) References Cited

U.S. PATENT DOCUMENTS 4,946,721 A * 8/1990 Kindervater .......... B29C 70/202
                                                         138/123
5,419,416 A * 5/1995 Miyashita ........... B60R 21/0132
                                                         188/371
(Continued)

FOREIGN PATENT DOCUMENTS

JP        2003-262246 A      9/2003

OTHER PUBLICATIONS

Translation of International Preliminary Report on Patentability dated May 30, 2017 in counterpart International Application No. PCT/JP2015/082751.

*Primary Examiner* — Christopher P Schwartz
(74) *Attorney, Agent, or Firm* — Sughrue Mion, PLLC

(57) ABSTRACT

An impact absorber absorbs impact energy when receiving an impact load. The impact absorber includes a fibrous structure. The fibrous structure includes a tube of which a center axis extends in a direction in which the impact load is applied and a rib that connects opposing inner surfaces of the tube. The fibrous structure is impregnated with a matrix resin. The direction in which the impact load is applied is referred to as an X direction, and a direction in which the rib connects the opposing inner surfaces of the tube is referred to as a Y direction. The tube includes a fiber layer including load direction yarns extending in the X direction and intersecting direction yarns intersecting the load direction yarns. The rib includes yarns extending only in a direction orthogonal to the X direction.

4 Claims, 3 Drawing Sheets

(51) Int. Cl.
*B60R 19/34* (2006.01)
*F16F 7/00* (2006.01)
*D02G 3/26* (2006.01)
*B29C 65/00* (2006.01)
*B32B 1/08* (2006.01)
*B32B 5/02* (2006.01)
*B32B 5/12* (2006.01)
*B32B 5/26* (2006.01)
*B62D 21/15* (2006.01)
*B62D 29/04* (2006.01)
*D03D 3/02* (2006.01)
*D03D 25/00* (2006.01)
*B29D 23/00* (2006.01)
*B29L 31/30* (2006.01)
*B29L 31/00* (2006.01)

(52) U.S. Cl.
CPC .............. *B32B 5/024* (2013.01); *B32B 5/12* (2013.01); *B32B 5/26* (2013.01); *B60R 19/34* (2013.01); *B62D 21/15* (2013.01); *B62D 29/04* (2013.01); *D02G 3/26* (2013.01); *D03D 3/02* (2013.01); *D03D 25/005* (2013.01); *F16F 7/00* (2013.01); *B29D 23/00* (2013.01); *B29L 2031/30* (2013.01); *B29L 2031/721* (2013.01); *B32B 2605/00* (2013.01); *D10B 2505/02* (2013.01)

(56) References Cited

U.S. PATENT DOCUMENTS

| | | | | |
|---|---|---|---|---|
| 5,925,435 | A * | 7/1999 | Togawa | F16F 7/121 280/748 |
| 6,830,286 | B2 * | 12/2004 | Bechtold | B29C 70/24 296/187.03 |
| 7,842,378 | B2 * | 11/2010 | Harada | F16F 7/124 428/137 |
| 8,668,247 | B2 * | 3/2014 | Kia | B60R 19/03 188/371 |
| 2002/0011047 | A1 * | 1/2002 | Obeshaw | B21C 37/15 52/794.1 |
| 2002/0180245 | A1 * | 12/2002 | Dogan | B62D 25/04 296/205 |
| 2004/0201252 | A1 | 10/2004 | Bechtold et al. | |
| 2006/0011435 | A1 * | 1/2006 | Yamaki | F16F 7/124 188/376 |
| 2011/0281061 | A1 * | 11/2011 | Nakamura | B29C 70/32 428/105 |
| 2013/0157001 | A1 * | 6/2013 | Knoff | D21H 27/30 428/118 |
| 2013/0280516 | A1 * | 10/2013 | Kozar | B29C 70/083 428/293.4 |

* cited by examiner

IMPACT-ABSORBING MATERIAL AND METHOD FOR PRODUCING IMPACT-ABSORBING MATERIAL

CROSS REFERENCE TO RELATED APPLICATIONS

This application is a National Stage of International Application No. PCT/JP2015/082751, filed on Nov. 20, 2015, which claims priority from Japanese Patent Application No. 2014-240998, filed on Nov. 28, 2014, the contents of all of which are incorporated herein by reference in their entirety.

TECHNICAL FIELD

The present invention relates to an impact absorber and a method for manufacturing the impact absorber.

BACKGROUND ART

An impact absorber is arranged, for example, between a bumper and a vehicle body frame. When receiving an impact load, the impact absorber undergoes compressive failure in a direction in which the impact load is received to absorb impact energy.

FIG. 6 shows a fiber composite impact-absorbing structure 80 disclosed in patent document 1. The fiber composite impact-absorbing structure 80 includes, for example, a hollow body 81, which is manufactured by yarns, and a web element 82, which is arranged in the hollow body 81. The hollow body 81 has the form of a conical tube. The web element 82 is I-shaped in a plan view of the fiber composite impact-absorbing structure 80 and is manufactured by fibers arranged at 45° with respect to an axial direction (X direction) of the hollow body 81.

The web element 82 is sewn to inner surfaces of the hollow body 81 with the two I-shaped ends contacting the inner surfaces. The web element 82 maintains the flat shape of the hollow body 81. Further, the web element 82 is arranged entirely in the axial direction of the hollow body 81. The fiber composite impact-absorbing structure 80 can absorb impact energy in the axial direction of the hollow body 81. Further, a fiber orientation of the web element 82 allows the fiber composite impact-absorbing structure 80 to absorb impact energy in a direction inclined with respect to the axial direction of the hollow body 81.

PRIOR ART DOCUMENT

Patent Document

Patent Document 1: Japanese Laid-Open Patent Publication No. 2003-262246

SUMMARY OF THE INVENTION

Problems that are to be Solved by the Invention

In the fiber composite impact-absorbing structure 80 of patent document 1, the fiber orientation of the web element 82 increases the strength for an impact load applied in the X direction. When the strength of the web element 82 is excessively high, even if an impact load is added so that the fiber composite impact-absorbing structure 80 undergoes compressive failure, the web element 82 may undergo buckling failure and not compressive failure. In this case, the portions sewn to the hollow body 81 may be broken, for example, fractured by the buckled web element 82. This lowers the capacity of the fiber composite impact-absorbing structure 80 to absorb impact energy. Thus, the thicknesses of the hollow body 81 and the web element 82 need to be set in accordance with the fiber orientation of the web element 82 so that the fiber composite impact-absorbing structure 80 undergoes compressive failure with a predetermined impact load. Accordingly, the manufacturing of the fiber composite impact-absorbing structure 80 is troublesome.

It is an object of the present invention to provide an impact absorber and a method for manufacturing the impact absorber that absorbs impact energy with compressive failure even if the impact absorber includes a rib that connects opposing inner surfaces of a tube extending along a center axis in a direction in which an impact load is applied.

MEANS FOR SOLVING THE PROBLEM

To achieve the above object, an impact absorber according to one aspect of the present invention absorbs impact energy when receiving an impact load. The impact absorber includes a fibrous structure and a matrix resin. The fibrous structure includes a tube of which a center axis extends in a direction in which the impact load is applied and a rib that connects opposing inner surfaces of the tube to each other. The fibrous structure is impregnated with the matrix resin. The direction in which the impact load is applied is referred to as an X direction, and a direction in which the rib connects the opposing inner surfaces of the tube to each other is referred to as a Y direction. The tube includes a fiber layer including load direction yarns, which are formed from reinforcement fibers, extending in the X direction and intersecting direction yarns, which are formed from reinforcement fibers, intersecting the load direction yarns. The rib includes yarns, which are formed from reinforcement fibers, extending only in a direction orthogonal to the X direction.

In this structure, when an impact load is applied to the impact absorber including the fibrous structure in the X direction, the impact load is applied to the tube and the rib. The rib keeps the opposing inner surfaces of the tube connected. This limits situations in which an impact load expands the tube in the Y direction. The rib has a low interference strength in the X direction. Thus, the rib immediately undergoes compressive failure in the X direction when receiving the impact load. That is, situations are limited in which the rib that has received the impact load undergoes buckling failure. Thus, the tube is unaffected by buckling failure of the rib and undergoes compressive failure in the X direction.

It is preferred that the rib have a thickness that is less than that of the tube.

In this structure, when the thickness of the rib decreases, the strength of the rib in the X direction decreases. Further, as compared to when the thickness of the rib is increased so that the thickness of the rib is equal to that of the tube, the material cost of the rib and the weight of the impact absorber are reduced.

It is preferred that the rib be formed only by yarns, which are formed from reinforcement fibers, extending in the Y direction.

This structure reduces the material cost of the rib and the weight of the impact absorber as compared to when, for example, the rib has a textile weave of the yarns, which are formed from reinforcement fibers, extending in the Y direction and the yarns, which are formed from reinforcement fibers, extending in a Z direction orthogonal to the Y direction and the X direction.

To achieve the above object, a method for manufacturing an impact absorber according to another aspect of the present invention includes manufacturing a fiber precursor that becomes a precursor of a fibrous structure. The fiber precursor includes a tube precursor and a rib precursor that connects opposing inner surfaces of the tube precursor to each other. The method further includes impregnating the fiber precursor with a resin material serving as a matrix resin prior to hardening and hardening the resin material. The tube precursor includes a fiber layer including load direction yarns, which are formed from reinforcement fibers, extending along a center axis of the tube precursor, and intersecting direction yarns, which are formed from reinforcement fibers, intersecting the load direction yarns. The rib precursor includes a fiber layer that at least includes first rib yarns, which are formed from reinforcement fibers, connecting the opposing inner surfaces of the tube precursor to each other and second rib yarns that form a textile weave with the first rib yarns. The second rib yarns are formed from low-melting resin fibers. When impregnating the fiber precursor with the resin material and hardening the resin material, the second rib yarns melt and mix with the matrix resin in a compatible manner.

In this method, when manufacturing the fiber precursor, the rib precursor is formed by weaving at least the first rib yarns and the second rib yarns. This holds the shape of the rib precursor and easily maintains the shape of the fiber precursor. The second rib yarns are formed from low-melting resin fibers. Thus, when the fiber precursor is impregnated with the resin material serving as the matrix resin prior to hardening and heated to be hardened, the heat melts the second rib yarns. As a result, the yarns of the rib manufactured from the rib precursor are only the first rib yarns. In the fibrous structure used for the impact absorber manufactured from the fiber precursor, a direction in which the impact load is applied is referred to as an X direction, and a direction in which the rib connects the opposing inner surfaces of the tube to each other is referred to as a Y direction. The first rib yarns are yarns, which are formed from reinforcement fibers, extending in a direction orthogonal to the X direction. Accordingly, in the manufacturing method for integrally forming the fibrous structure by weaving the tube and the rib, the rib only includes the yarns, which are formed from reinforcement fibers, extending in the direction orthogonal to the X direction.

EMBODIMENTS OF THE INVENTION

One embodiment of an impact absorber and a method for fabricating the impact absorber will now be described with reference to FIGS. 1 to 4.

Figure 1:
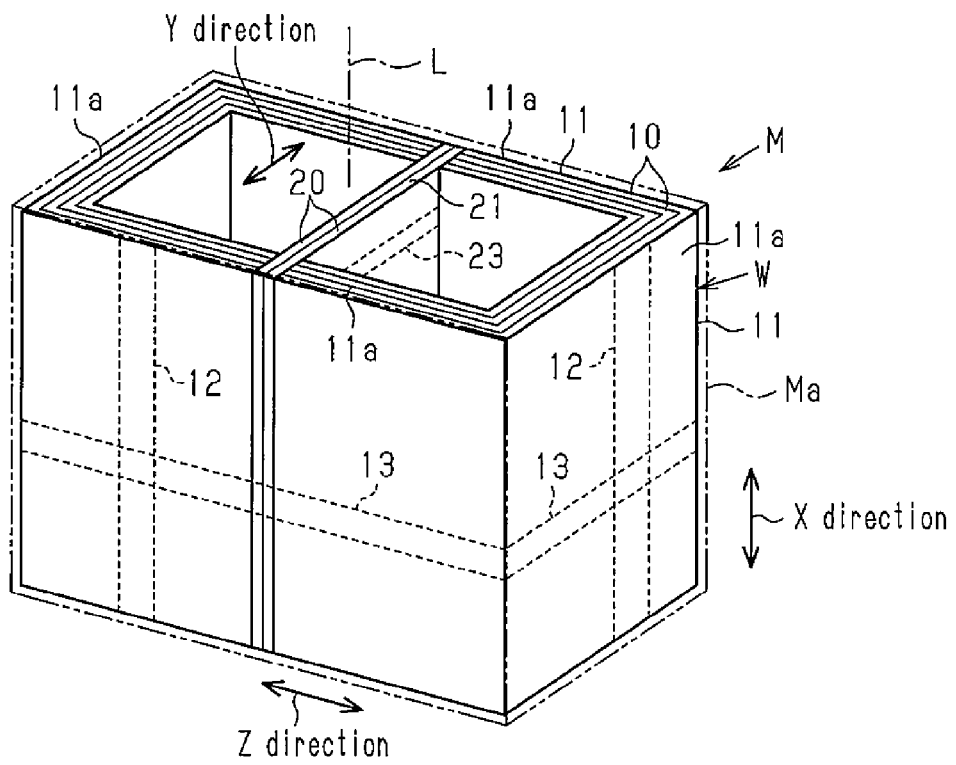
FIG. 1 is a perspective view showing an impact absorber according to one embodiment of the present invention.

As shown in FIG. 1, an impact absorber M includes a fibrous structure W, which is used as a fiber base to absorb impact (hereinafter referred to as fibrous structure W), and a matrix resin Ma, with which the fibrous structure W is impregnated.

Figure 2:
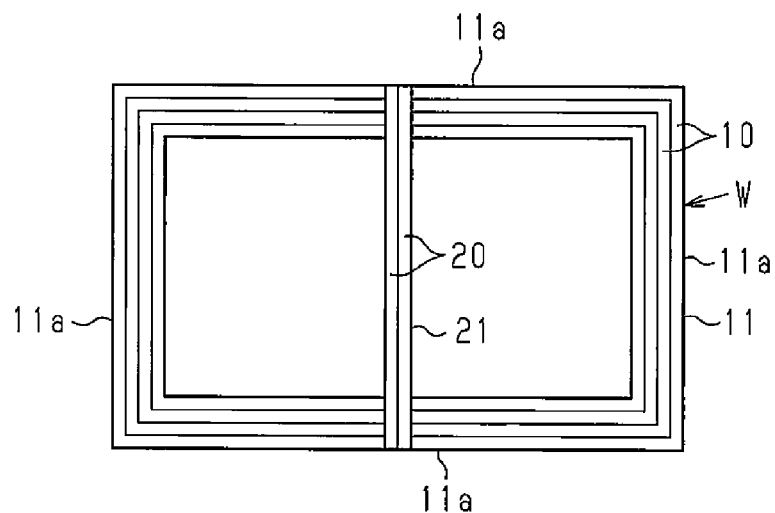
FIG. 2 is a plan view of a fibrous structure used for the impact absorber shown in FIG. 1.

As shown in FIGS. 1 and 2, the fibrous structure W includes a tube 11, which is box-shaped, and a rib 21 located in the tube 11. The fibrous structure W is formed by integrally weaving the tube 11 and the rib 21 with each other. The fibrous structure W is shaped to connect two rectangular-shapes in a plan view as viewed in a direction in which the center axis L of the tube 11 extends (hereinafter referred to as axial direction).

The tube 11 is a rectangular-shape in a plan view corresponding to the axial direction of the tube 11. The tube 11 includes four side plates 11a. Adjacent ones of the side plates 11a are orthogonal to each other. Thus, the tube 11 is a rectangular-shape in a plan view and hollow. The rib 21 is flat. The rib 21 connects the opposing side plates 11a of the tube 11 to each other, that is, connects opposing inner surfaces of the tube 11. The thickness of each side plate 11a of the tube 11 is greater than that of the rib 21.

Figure 3:
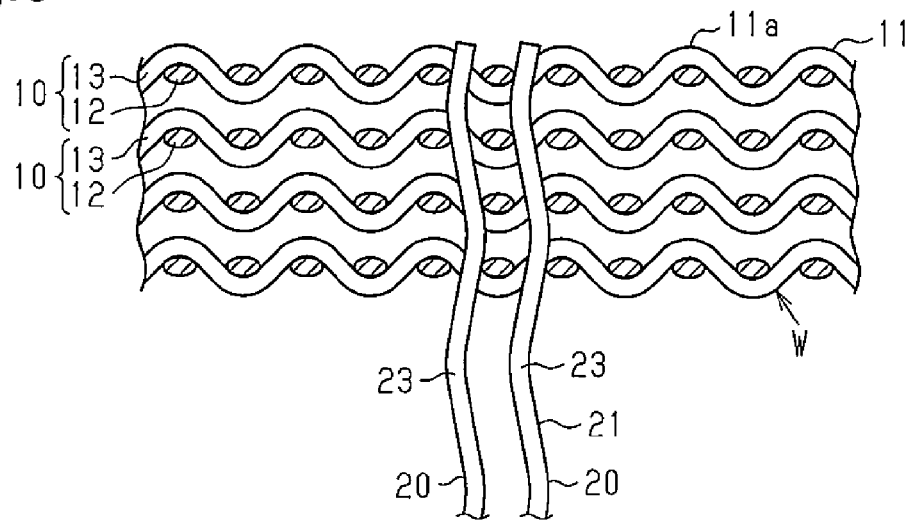
FIG. 3 is a partial, cross-sectional view of a tube and a rib of the fibrous structure shown in FIG. 1.

As shown in FIG. 3, the tube 11 includes a plurality of (four) tube fiber layers 10 that are stacked in a thickness-wise direction of each side plate 11a. Each tube fiber layer 10 is formed by weaving tube wefts 12, which are formed from reinforcement fibers, and tube warps 13, which are formed from reinforcement fibers. "Reinforcement fibers" refer to fiber bundles that serve to reinforce the matrix resin Ma of the impact absorber M when the fibrous structure W is used as a fiber base of the impact absorber M. In the present embodiment, carbon fibers are used as reinforcement fibers, and the tube wefts 12 and the tube warps 13 are yarns of the same carbon fiber.

Further, each of the tube wefts 12 includes a fiber bundle. The tube wefts 12 extend straight in parallel to one another. Each of the tube warps 13 includes a fiber bundle. The tube warps 13 extend straight in parallel to one another in a direction intersecting (orthogonal to) the tube wefts 12. Each tube fiber layer 10 is formed by plain-weaving the tube wefts 12 and the tube warps 13. The rib 21 is formed only by rib warps 23, which are formed from reinforcement fibers. In the present embodiment, carbon fibers are used for the rib warps 23 as reinforcement fibers.

The rib 21 includes a plurality of (two) stacked rib fiber layers 20. Each rib fiber layer 20 is formed so that the rib warps 23 are arranged in parallel to one another. In each rib fiber layer 20, the rib warps 23 extend straight and connect inner surfaces of the opposing side plates 11a. The direction in which the rib warps 23 extend is orthogonal to the direction in which the tube wefts 12 extend in the tube 11 and the direction in which the tube warps 13 extend in the two side plates 11a, which are connected by the rib 21.

The thickness of the rib 21 is less than that of each side plate 11a of the tube 11. More specifically, the rib 21 includes the two stacked rib fiber layers 20, and the tube 11 includes the four stacked tube fiber layers 10.

As shown in FIG. 1, in the fibrous structure W, the direction in which the tube wefts 12 extend in the tube 11 is referred to an X direction of the fibrous structure W. The impact absorber M is used to apply an impact load in the X direction. Thus, in the tube 11 of the present embodiment, the tube wefts 12 serve as load direction yarns, and the tube warps 13 serve as intersecting direction yarns intersecting the load direction yarns. The intersecting direction yarns are formed from reinforcement fibers. Further, in the fibrous structure W, the direction in which the rib 21 connects the opposing inner surfaces of the tube 11 is referred to as a Y direction. The Y direction is a direction in which the rib warps 23 extend in the rib 21.

In addition, in the fibrous structure W, the direction orthogonal to the X direction and the Y direction is referred to as a Z direction. The Z direction is a direction in which the tube warps 13 extend in the two side plates 11a connected by the rib 21. The X direction is orthogonal to the Y direction, the Y direction is orthogonal to the Z direction, and the X direction is orthogonal to the Z direction.

In the tube 11, the tube wefts 12 extend straight in the X direction and have straightness. Thus, the tube wefts 12 increase the strength of the tube 11 in the X direction (load direction). Further, in the tube 11, the tube warps 13 extend straight in the Y direction or the Z direction except for corners of the tube 11 and have straightness. Thus, in the tube 11, the tube warps 13 increase the strength in the Z direction of the two side plates 11a that are connected by the rib 21, and the tube warps 13 increase the strength in the Y direction of the two side plates 11a that are not connected by the rib 21.

In the tube 11, even if the tube wefts 12 and the tube warps 13 are plain-woven and contact one other so that one yarns of the tube wefts 12 and the tube warps 13 curve along the other yarns, the tube wefts 12 and the tube warps 13 extend straight in the corresponding directions and thus have straightness.

In the rib 21, the rib warps 23 extend straight in the Y direction and have straightness. Thus, the rib warps 23 increase the strength of the rib 21 in the Y direction. However, the strength of the rib 21 is not increased in the X direction and the Z direction. Further, in the fibrous structure W, the rib 21 restricts an increase in the distance between the two side plates 11a. Since the rib 21 restricts an increase in the distance between the two side plates 11a, an increase in the distance between the remaining two side plates 11a is also restricted.

The impact absorber M is formed by impregnating the fibrous structure W with the matrix resin Ma. A thermosetting resin is used as the matrix resin Ma. The tube 11 and the rib 21 are impregnated with the matrix resin Ma.

The operation of the impact absorber M and the fibrous structure W will now be described.

In the impact absorber M, when an excessive impact load is applied to an end surface of the tube 11 in the X direction (load direction), the tube 11 undergoes compressive failure in the X direction to absorb impact energy. The rib 21 does not include yarns extending in the X direction and thus undergoes compressive failure in the X direction when receiving an impact load.

The method for fabricating the impact absorber M will now be described.

The method for fabricating the impact absorber M includes a process for fabricating a fiber precursor 40 that becomes a precursor of the fibrous structure W and an impregnation hardening process for impregnating the fiber precursor 40 with a resin material that serves as the matrix resin Ma prior to hardening and hardening the resin material.

Figure 4A:
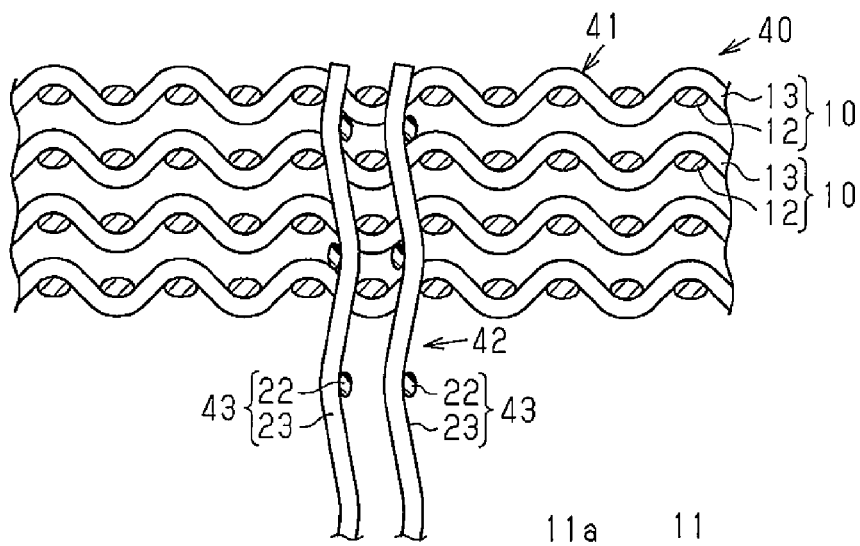
FIG. 4A is a partial, cross-sectional view showing a portion of a fiber precursor.

First, the process for fabricating the fiber precursor 40 will be described. The fiber precursor 40 is a tubular and includes a tube precursor 41, which has the same shape as the tube 11, and a rib precursor 42 that connects opposing inner surfaces of the tube precursor 41. As shown in FIG. 4A, in the process for fabricating the fiber precursor 40, a loom (not shown) plain-weaves the tube wefts 12 and the tube warps 13 into the tube fiber layers 10. In this case, the tube fiber layers 10 are simultaneously woven to fabricate the tube precursor 41 having a multi-layer structure that includes the tube fiber layers 10. In the tube precursor 41, the tube wefts 12 form the load direction yarns, and the tube warps 13 form the intersecting direction yarns that intersect the load direction yarns and are formed from reinforcement fibers. The tube precursor 41 is woven to extend so that the tube wefts 12 extend along the center axis of the tube precursor 41.

Further, the rib precursor 42 is fabricated at the same time as the tube precursor 41 being fabricated. The rib precursor 42 plain-weaves the rib wefts 22 and the rib warps 23 (forms textile weave) into fiber layers 43. The fiber layers 43 are simultaneously woven to fabricate the rib precursor 42 having a multi-layer structure that includes the fiber layers 43.

When the fiber precursor 40 is fabricated, the rib warps 23 connect opposing inner surfaces of the tube precursor 41, and the rib wefts 22 form a textile weave with the rib warps 23. Thus, in the present embodiment, the rib warps 23 form first rib yarns, and the rib wefts 22 form second rib yarns.

The rib wefts 22, which form the second rib yarns, are yarns formed from low-melting resin fibers. In the present embodiment, the rib weft 22 is fabricated from a resin compatible with the matrix resin Ma of the impact absorber M. When the rib wefts 22 are heated to thermally harden the resin material, which is a matrix resin prior to thermal hardening, in order to fabricate the impact absorber M, the heat melts the rib wefts 22. The rib wefts 22 melt and mix with the matrix resin Ma of the impact absorber M and the hardened resin material in a compatible manner.

After forming the fiber precursor 40 in which the tube precursor 41 and the rib precursor 42 are woven integrally with each other, the process for fabricating the fiber precursor 40 is completed.

Figure 4B:
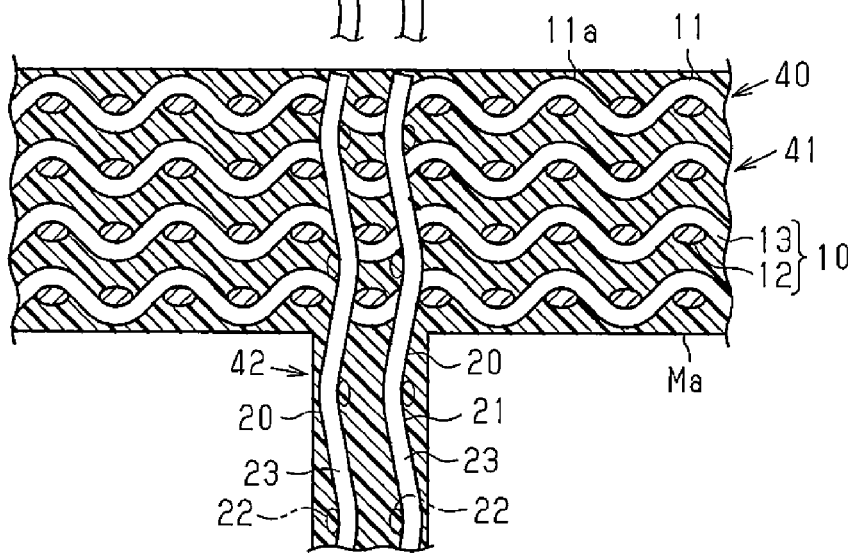
FIG. 4B is a partial, cross-sectional view showing a portion of the impact absorber.

Next, the impregnation hardening process is performed. As shown in FIG. 4B, the fiber precursor 40 is impregnated with a resin material prior to thermal hardening to thermally harden the resin material. Impregnation hardening of the resin material is performed with a resin transfer molding (RTM) process. More specifically, the fiber precursor 40 is enclosed in a mold including recesses and projections, and a resin material prior to thermal hardening is injected into the mold. Then, the resin material prior to thermal hardening is heated. Subsequently, the rib wefts 22 that have formed the rib precursor 42 become molten by the heat and then hardened together with the resin material that will form the matrix resin Ma.

As a result, the matrix resin Ma is formed by the resin material of the molten rib wefts 22 and the resin material injected for the matrix resin Ma. Further, when the rib wefts 22 that have formed the rib precursor 42 melt, the fiber precursor 40 becomes the fibrous structure W including the rib 21 that is formed only by the rib warps 23. That is, the tube 11 is formed by the tube precursor 41, and the rib 21 is formed by the rib precursor 42 in which the rib wefts 22 have been removed. Consequently, the impact absorber M in which the fibrous structure W is impregnated with the matrix resin Ma is fabricated.

The above embodiment has the advantages described below.

(1) In the fibrous structure W, the rib 21 is formed only by the rib warps 23 that connect the side plates 11a to each other. Thus, when an impact load is applied to the impact absorber M in the X direction, the rib 21 immediately undergoes compressive failure in the X direction, and buckling failure of the impact absorber M is limited. This limits fracture or the like near the portions of the impact absorber M where the tube 11 and the rib 21 are connected. As a result, the impact absorber M sequentially undergoes compressive failure in the X direction and absorbs impact energy in a preferred manner.

(2) For example, when the strength of the rib 21 in the X direction is increased, the rib 21 interferes so that the compressive failure is not likely to occur even if an impact designed to cause compressive failure is applied to the impact absorber M. In this case, buckling failure is more likely to occur. Thus, the thicknesses of the tube 11 and the rib 21 need to be reduced so that the designed impact load causes the impact absorber M to undergo compressive failure. However, the rib 21 is formed only by the rib warps 23 so that the strength of the rib 21 in the X direction does not increase. This eliminates the need to adjust the thicknesses of the tube 11 and the rib 21 and allows the impact absorber M to undergo compressive failure with the designed impact load.

(3) The rib 21 limits an increase in the distance between the opposing side plates 11a when an impact load is applied to the impact absorber M in the X direction. This maintains the flat shape of the tube 11. Thus, the end surface of the tube 11 receives the impact load applied in the X direction in a preferred manner to absorb the impact energy.

(4) The rib 21 is formed only by the rib warps 23. This reduces the material cost of the rib 21 as compared to when, for example, the rib 21 is formed by weaving the rib warps 23 and wefts to form a textile weave. This further reduces the weight of the fibrous structure W and consequently reduces the weight of the impact absorber M.

(5) The thickness of the rib 21 is less than that of each side plate 11a of the tube 11. Thus, as the thickness decreases, the strength of the rib 21 in the X direction deceases. Further, as compared to when, for example, the thickness of the rib 21 is increased so that the thickness of the rib 21 is equal to that of the tube 11, the material cost of the rib 21 is reduced. This further reduces the weight of the fibrous structure W and consequently reduces the weight of the impact absorber M.

(6) The rib 21 is formed only by the rib warps 23. When fabricating the fiber precursor 40, which is a precursor of the fibrous structure W, the rib precursor 42 is formed by plain-weaving the rib warps 23 and the rib wefts 22. This easily maintains the flat shape of the rib precursor 42 and facilitates the fabricating of the fiber precursor 40.

(7) When fabricating the fiber precursor 40, the rib precursor 42 is formed by plain-weaving the rib warps 23 and the rib wefts 22. Yarns formed from resin fibers compatible with the matrix resin Ma are used as the rib wefts 22. Thus, when the fiber precursor 40 is impregnated with the resin material and thermally hardened, the rib wefts 22 can become molten. As a result, the yarns of the rib 21 fabricated from the rib precursor 42 are only the rib warps 23. Thus, the rib 21 can be fabricated only by the rib warps 23 even with the fabricating method for weaving the tube 11 and the rib 21 to integrally form the fibrous structure W.

The above embodiment may be modified as described below.

In the rib precursor 42 of the fiber precursor 40, the rib wefts 22 are fabricated by yarns formed from a resin compatible with the resin material of the matrix resin Ma. However, the yarns that form the rib wefts 22 may be changed as long as the yarns are coupled to the matrix resin.

When fabricating the fiber precursor 40, the tube precursor 41 and the rib precursor 42 may be separately formed and sewn (coupled) integrally to form the fiber precursor 40.

Figure 5:
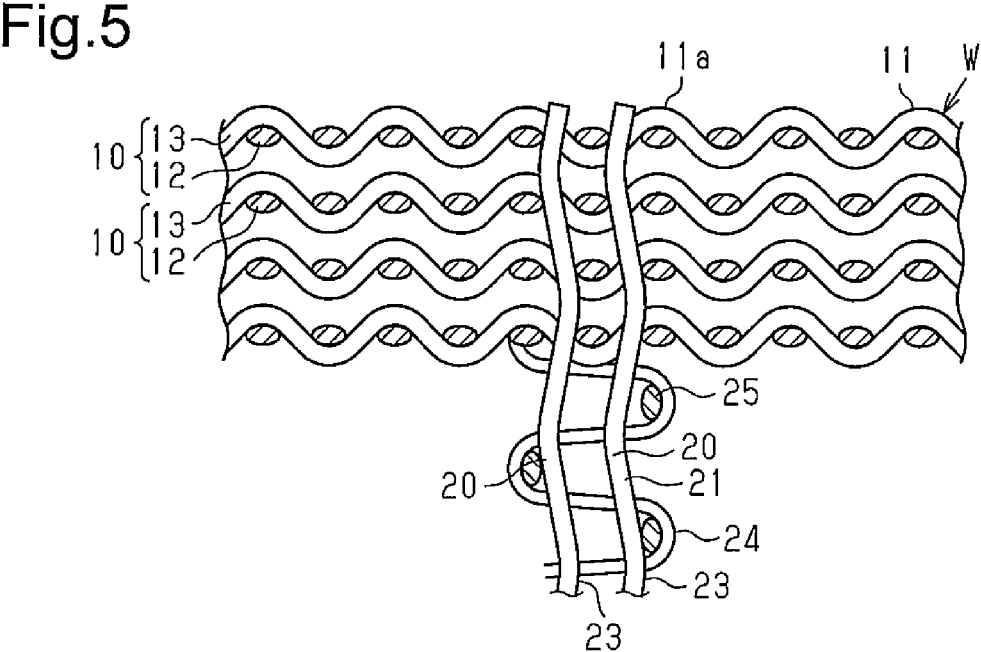
FIG. 5 is a partial, cross-sectional view showing another example of a fibrous structure used for an impact absorber.
Figure 6:
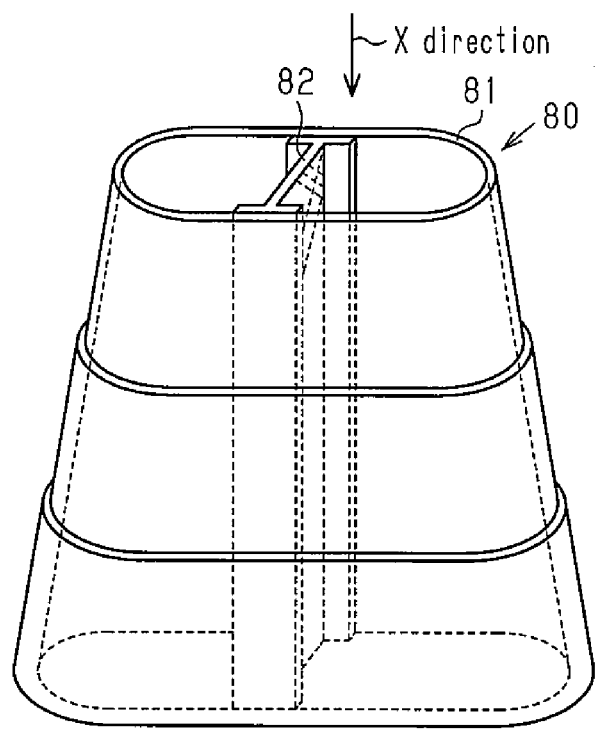
FIG. 6 is a diagram showing the prior art.

As shown in FIG. 5, the rib 21 may include not only the rib warps 23 but also interlock yarns 24 and tying yarns 25 that couple the rib fiber layers 20 in the stacking direction.

The interlock yarns 24 and the tying yarns 25 are formed from reinforcement fibers. In this case, the interlock yarns 24 forms orthogonal direction yarns extending in the Z direction orthogonal to the X direction in which an impact load is applied. The orthogonal direction yarns are formed from reinforcement fibers. The tying yarns 25 are formed from fibers that have a lower strength than reinforcement fibers. Addition of the interlock yarns 24 and the tying yarns 25 does not increase the strength of the rib 21 in the X direction. Thus, when an impact load is applied to the impact absorber M in the X direction, the rib 21 immediately undergoes compressive failure in the X direction, and buckling failure is limited.

When fabricating the fiber precursor 40, the rib precursor 42 may be fabricated by the rib warps 23 formed from reinforcement fibers and interlock yarns formed from low-melting resin fibers. The interlock yarns are orthogonal to the rib wefts 22, which are formed from low-melting resin fibers, and the rib warps 23. In this case, the rib wefts 22 and the interlock yarns melt during the immersion hardening process. Subsequently, the matrix resin Ma is formed.

The tube 11 is formed by a textile weave such as plain weave. Instead, for example, the tube wefts 12 may be arranged in parallel to one another to form a fiber layer, and the tube warps 13 are arranged in parallel to one another to form another fiber layer. The tube 11 may be formed by stacking these fiber layers and coupling the fiber layers to each other with thickness-wise direction yarns.

The rib fiber layers 20 may include four stacked layers so that the thickness of the rib 21 is equal to that of each side plate 11a of the tube 11.

The tube 11 does not have to be box-shaped. Instead, the flat shape of the tube 11 may be changed as long as the tube 11 is hollow. For example, the shape of the tube 11 may be changed to a circular tube having a circular-shape in a plan view or a hexagonal tube having a hexagonal shape in a plan view. In addition, the tube 11 may have the form of a conical tube or a pyramidal tube extending from one end toward the other end in the axial direction with the width increasing.

There may be two or more ribs 21 in the tube 11. In this case, the ribs 21 may be arranged next to each other in parallel. Alternatively, the ribs 21 may intersect each other. When the ribs 21 intersect each other, a direction in which each of the ribs 21 connects the opposing inner surfaces is the Y direction.

The textile weaving of the tube 11 does not have to be plain weaving and may be satin weaving or twill weaving.

When fabricating the rib precursor 42, the rib precursor 42 does not have to be formed by plain-weaving the rib wefts 22 and the rib warps 23. Instead, the rib precursor 42 may be formed through sateen weaving or twill weaving.

In the embodiment, the number of the tube fiber layers 10 of the tube 11 is four. Instead, the number of the tube fiber layers 10 of the tube 11 may be two, three, or five or more. In this case, the number of the rib fiber layers 20 of the rib 21 is less than or equal to the number of the stacked tube fiber layers 10 of the tube 11.

The method for fabricating the impact absorber M by impregnating the fibrous structure W with the matrix resin Ma and hardening the matrix resin Ma is not limited to the RTM process.

The invention claimed is:

1. An impact absorber that absorbs impact energy when receiving an impact load, the impact absorber comprising:
   a fibrous structure including
      a tube of which a center axis extends in a direction in which the impact load is applied, and a rib that connects opposing inner surfaces of the tube to each other; and a matrix resin with which the fibrous structure is impregnated, wherein when referring to the direction in which the impact load is applied as an X direction and a direction in which the rib connects the opposing inner surfaces of the tube to each other as a Y direction, the tube includes a fiber layer including load direction yarns, which are formed from reinforcement fibers, extending in the X direction, and intersecting direction yarns, which are formed from reinforcement fibers, intersecting the load direction yarns, and the rib includes yarns, which are formed from reinforcement fibers, extending only in a direction orthogonal to the X direction.

2. The impact absorber according to claim 1, wherein the rib has a thickness that is less than that of the tube.

3. The impact absorber according to claim 1, wherein the rib is formed only by yarns, which are formed from reinforcement fibers, extending in the Y direction.

4. A method for manufacturing an impact absorber that absorbs impact energy when receiving an impact load, the method comprising:

manufacturing a fiber precursor that becomes a precursor of a fibrous structure, wherein the fiber precursor includes a tube precursor and a rib precursor that connects opposing inner surfaces of the tube precursor to each other; and impregnating the fiber precursor with a resin material serving as a matrix resin prior to hardening and hardening the resin material, wherein the tube precursor includes a fiber layer including load direction yarns, which are formed from reinforcement fibers, extending along a center axis of the tube precursor, and intersecting direction yarns, which are formed from reinforcement fibers, intersecting the load direction yarns, the rib precursor includes a fiber layer that at least includes first rib yarns, which are formed from reinforcement fibers, connecting the opposing inner surfaces of the tube precursor to each other, and second rib yarns that form a textile weave with the first rib yarns, the second rib yarns are formed from low-melting resin fibers, and when impregnating the fiber precursor with the resin material and hardening the resin material, the second rib yarns melt and mix with the matrix resin in a compatible manner.

* * * * *